US008565672B2

(12) United States Patent
Doppler et al.

(10) Patent No.: US 8,565,672 B2
(45) Date of Patent: Oct. 22, 2013

(54) COMMUNICATION

(75) Inventors: Klaus Franz Doppler, Espoo (FI);
Jarkko Lauri Sakari Kneckt, Espoo
(FI); Tero Heikki Matti Henttonen,
Espoo (FI)

(73) Assignee: Nokia Corporation, Espoo (FI)

( * ) Notice: Subject to any disclaimer, the term of this patent is extended or adjusted under 35 U.S.C. 154(b) by 510 days.

(21) Appl. No.: 12/772,325

(22) Filed: May 3, 2010

(65) Prior Publication Data

US 2010/0285825 A1 Nov. 11, 2010

Related U.S. Application Data

(60) Provisional application No. 61/215,486, filed on May 5, 2009.

(51) Int. Cl.
*H04B 7/185* (2006.01)

(52) U.S. Cl.
USPC .......................................... 455/13.1; 370/315

(58) Field of Classification Search
USPC .................. 455/436, 438, 439, 442, 444, 432
See application file for complete search history.

(56) References Cited

U.S. PATENT DOCUMENTS

| 7,539,490 B2 * | 5/2009 | Dickinson ................... 455/432.1 |
| 7,565,109 B2 * | 7/2009 | Morioka et al. ............ 455/63.1 |
| 8,305,946 B2 * | 11/2012 | Kubo ............................. 370/311 |
| 2009/0190553 A1 * | 7/2009 | Masuda et al. ................. 370/331 |

* cited by examiner

*Primary Examiner* — Tu X Nguyen
(74) *Attorney, Agent, or Firm* — Harrington & Smith

(57) ABSTRACT

Various apparatuses, methods and computer programs are provided. A first apparatus includes: a controller configured to control transmitter circuitry to transmit, according to a first communication protocol, a first request to a second apparatus, the first request being for assisting a wireless communication link, according to a second communication protocol, to be established between the apparatus and a third apparatus. In response to receiving the first request, the second apparatus transmits a second request to the third apparatus. The third apparatus is configured to transmit signals at a rate, each signal being for enabling a wireless communication link to be established between the third apparatus and another apparatus (such as the first apparatus). In response to receipt of the second request, the third apparatus changes the rate at which the signals are transmitted.

16 Claims, 5 Drawing Sheets

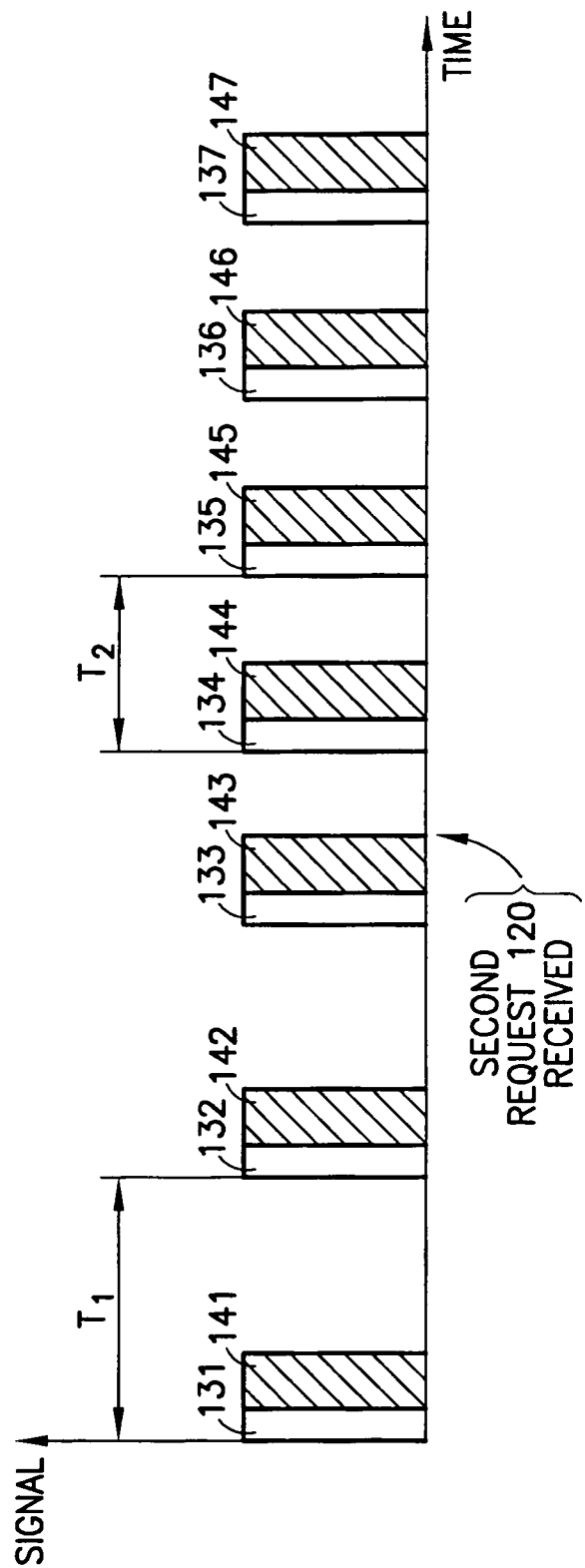

COMMUNICATION

CROSS-REFERENCE TO RELATED APPLICATIONS:

This patent application claims priority under 35 U.S.C. §119(e) from U.S. Provisional Patent Application No.: 61/215,486, filed May 05, 2009, the disclosure of which is incorporated by reference herein in its entirety.

FIELD OF THE INVENTION

Embodiments of the present invention relate to communication. In particular, they relate to apparatuses, methods and computer programs that use a first network to establish a communication link in a second network.

BACKGROUND TO THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

An access point of a wireless local area network may transmit beacons periodically which enable a wireless communication link to be formed between the access point and an electronic device. The beacons may, for example, include information that identifies the transmitting access point and information that enables an electronic device to synchronize with the access point.

An electronic device may scan a spectrum of frequencies to determine whether there is an access point transmitting beacons in its vicinity. It may, however, take a while to detect a transmitted beacon.

BRIEF DESCRIPTION OF VARIOUS EMBODIMENTS OF THE INVENTION

The below summary section is intended to be merely exemplary and non-limiting.

The foregoing and other problems are overcome, and other advantages are realized, by the use of the exemplary embodiments of this invention.

According to various, but not necessarily all, embodiments of the invention there is provided an apparatus, comprising: a controller configured to control wireless transmitter circuitry to wirelessly transmit signals at a rate, each signal being for enabling a wireless communication link to be established between the apparatus and a further apparatus; and the controller being configured, in response to receipt of a request from another apparatus, to control the wireless transmitter circuitry to change the rate at which the signals are wirelessly transmitted by the wireless transmitter circuitry.

The controller may be configured, in response to receipt of the request from the another apparatus, to control the wireless transmitter circuitry to increase the rate at which the signals are wirelessly transmitted by the wireless transmitter circuitry.

The controller may be configured to control the wireless transmitter circuitry to change the wireless transmitter circuitry from being in a first state in which the signals are transmitted at a first rate, to being in a second state in which the signals are transmitted at a second rate.

Each of the transmitted signals may be for enabling a further apparatus to synchronize with the apparatus. Each of the transmitted signals may include data identifying the apparatus. Each of the transmitted signals may be a beacon.

The apparatus may be a node of a first network, the another apparatus may be a node of a second network, and the first network and the second network may be different networks that use different communication protocols. The first network may be a local area network and the second network may be a wide area network.

The apparatus may further comprise the wireless transmitter circuitry and receiver circuitry configured to receive the request from the another apparatus.

According to various, but not necessarily all, embodiments of the invention there is provided a method, comprising: controlling signals to be wirelessly transmitted at a rate, each signal being for enabling a wireless communication link to be established between an apparatus and a further apparatus; and changing, in response to reception of a request, the rate at which the signals are wirelessly transmitted.

In response to reception of the request, the rate at which the signals are wirelessly transmitted may be increased.

Prior to reception of the request, the signals may be transmitted at a first rate, and, after receipt of the request, the signals may be transmitted at a second rate.

Each of the transmitted signals may be transmitted by the apparatus and the request may be received from another apparatus. Each of the transmitted signals may be for enabling a further apparatus to synchronize with the apparatus. Each of the transmitted signals may include data identifying the apparatus. Each of the transmitted signals may be a beacon.

The signals may be transmitted by a node of a first network, the another apparatus may be a node of a second network, and the first network and the second network may be different networks that use different communication protocols. The first network may be a local area network and the second network may be a wide area network.

According to various, but not necessarily all, embodiments of the invention there is provided a computer program comprising computer program instructions that, when executed by a processor, enable: transmitting wireless signals at a rate, each wireless signal being for enabling a wireless communication link to be established between an apparatus and a further apparatus; and changing, in response to reception of a request, the rate at which the wireless signals are transmitted.

The computer program may be stored by a tangible computer readable medium.

In response to reception of the request from the another apparatus, the rate at which the wireless signals are transmitted may be increased.

Prior to reception of the request, the wireless signals may be transmitted at a first rate, and, after receipt of the request, the wireless signals may be transmitted at a second rate.

Each of the wireless signals may be transmitted by the apparatus and the request may be received from another apparatus. Each of the wireless signals may be for enabling a further apparatus to synchronize with the apparatus. Each of the wireless signals may include data identifying the apparatus. Each of the wireless signals may be a beacon.

The wireless signals may be transmitted by a node of a first network, the another apparatus may be a node of a second network, and the first network and the second network may be different networks that use different communication protocols. The first network may be a local area network and the second network may be a wide area network.

According to various, but not necessarily all, embodiments of the invention there is provided an apparatus, comprising:

means for controlling wireless transmitting means to wirelessly transmit signals at a rate, each signal being for enabling a wireless communication link to be established between the apparatus and a further apparatus; and means for controlling, in response to receipt of a request from another apparatus, the wireless transmitting means to change the rate at which the signals are wirelessly transmitted by the wireless transmitting means.

According to various, but not necessarily all, embodiments of the invention there is provided an apparatus, comprising: a controller configured, in response to receipt of a first request relating to establishing a wireless communication link between a further apparatus and another apparatus, to control transmitter circuitry to transmit a second request to the another apparatus, in order to cause the another apparatus to change a rate at which signals are wirelessly transmitted by the another apparatus, each signal being for enabling a wireless communication link to be established between a further apparatus and the another apparatus.

The second request may include data instructing the another apparatus to change the rate at which the signals are wirelessly transmitted by the another apparatus.

The first request and the second request may include data instructing the another apparatus to change the rate at which the signals are wirelessly transmitted by the another apparatus.

The controller may be configured to control the transmitter circuitry to transmit the second request to the another apparatus, in order to cause the another apparatus to increase the rate at which the signals are wirelessly transmitted by the another apparatus.

The controller may be configured to control the transmitter circuitry to transmit the second request to the another apparatus, in order to cause the another apparatus to change from being in a first state in which the signals are wirelessly transmitted at a first rate, to being in a second state in which the signals are wirelessly transmitted at a second rate.

Each of the transmitted signals may be for enabling a further apparatus to synchronize with the another apparatus. Each of the transmitted signals may include data identifying the another apparatus. Each of the transmitted signals may be a beacon. The first request may be directly or indirectly received from the further apparatus.

The apparatus may be a node of a first network, the another apparatus may be a node of a second network and the first network and the second network may be different networks that use different communication protocols. The first network may be a wide area network and the second network may be a local area network. The wide area network may be a cellular telephone network or the Internet.

According to various, but not necessarily all, embodiments of the invention there is provided a method, comprising: enabling a first request to be received by an apparatus, the first request relating to establishing a wireless communication link between a further apparatus and another apparatus; and enabling transmitter circuitry to transmit, in response to receipt of the first request by the apparatus, a second request to the another apparatus, in order to cause the another apparatus to change a rate at which signals are wirelessly transmitted by the another apparatus, each signal being for enabling a wireless communication link to be established between a further apparatus and the another apparatus.

The second request may include data instructing the another apparatus to change the rate at which the signals are wirelessly transmitted by the another apparatus.

The first request and the second request may include data instructing the another apparatus to change the rate at which the signals are wirelessly transmitted by the another apparatus.

The second request may be transmitted to the another apparatus in order to cause the another apparatus to increase the rate at which the signals are wirelessly transmitted by the another apparatus.

The second request may be transmitted to the another apparatus in order to cause the another apparatus to change from being in a first state in which the signals are wirelessly transmitted at a first rate, to being in a second state in which the signals are wirelessly transmitted at a second rate.

Each of the transmitted signals may be for enabling a further apparatus to synchronize with the another apparatus. Each of the transmitted signals may include data identifying the another apparatus. Each of the transmitted signals may be a beacon.

The first request may be directly or indirectly received from the further apparatus. The apparatus may be a node of a first network and the another apparatus may be a node of a second network, and the first network and the second network may be different networks that use different communication protocols. The first network may be a wide area network and the second network may be a local area network. The wide area network may be a cellular telephone network or the internet.

According to various, but not necessarily all, embodiments of the invention there is provided a computer program comprising computer program instructions that, when executed by a processor, enable: receiving a first request at an apparatus, the first request relating to establishing a wireless communication link between a further apparatus and another apparatus; and controlling, in response to receipt of the first request by the apparatus, transmitter circuitry to transmit a second request to the another apparatus, in order to cause the another apparatus to change a rate at which signals are wirelessly transmitted by the another apparatus, each signal being for enabling a wireless communication link to be established between a further apparatus and the another apparatus.

The computer program may be stored by a tangible computer readable medium.

The second request may include data instructing the another apparatus to change the rate at which the signals are wirelessly transmitted by the another apparatus.

The first request and the second request may include data instructing the another apparatus to change the rate at which the signals are wirelessly transmitted by the another apparatus.

The second request may be transmitted to the another apparatus in order to cause the another apparatus to increase the rate at which the signals are wirelessly transmitted by the another apparatus.

The second request may be transmitted to the another apparatus in order to cause the another apparatus to change from being in a first state in which the signals are wirelessly transmitted at a first rate, to being in a second state in which the signals are wirelessly transmitted at a second rate.

Each of the transmitted signals may be for enabling a further apparatus to synchronize with the another apparatus. Each of the transmitted signals may include data identifying the another apparatus. Each of the transmitted signals may be a beacon.

The first request may be directly or indirectly received from the further apparatus. The apparatus may be a node of a first network, the another apparatus may be a node of a second network, and the first network and the second network may be different networks that use different communication protocols. The first network may be a wide area network and the second network may be a local area network. The wide area network may be a cellular telephone network or the Internet.

According to various, but not necessarily all, embodiments of the invention there is provided an apparatus, comprising: means for controlling, in response to receipt of a first request relating to establishing a wireless communication link between a further apparatus and another apparatus, transmitting means to transmit a second request to the another apparatus, in order to cause the another apparatus to change a rate at which signals are wirelessly transmitted by the another apparatus, each signal being for enabling a wireless communication link to be established between a further apparatus and the another apparatus.

According to various, but not necessarily all, embodiments of the invention there is provided an apparatus, comprising: a controller configured to control transmitter circuitry to transmit, according to a first communication protocol, a request to a further apparatus, the request being for assisting a wireless communication link, according to a second communication protocol, to be established between the apparatus and another apparatus.

The request may be for changing the rate at which signals are transmitted by the another apparatus. The request may be for changing the another apparatus from being in a first state in which the signals are transmitted, at a first rate, by the another apparatus, to being in a second state in which signals are transmitted, at a second rate, by the another apparatus.

The apparatus may comprise receiver circuitry configured to receive signals transmitted according to the second communication protocol.

The signals may be for establishing the wireless communication link, according to the second communication protocol, between the apparatus and the another apparatus. The controller may be configured, in response to receiving a signal transmitted according to the second communication protocol, to control transceiver circuitry to establish the wireless communication link with the another apparatus.

The signals may be beacons. The further apparatus may be a node of a first network, the another apparatus may be a node of a second network, and the first and second networks may be different networks that use different communication protocols. The first network may be a wide area network and the second network may be a local area network.

According to various, but not necessarily all, embodiments of the invention there is provided a method, comprising: enabling an apparatus to transmit a request to a further apparatus, the request being transmitted according to a first communication protocol and being for assisting a wireless communication link, according to a second communication protocol, to be established between the apparatus and another apparatus.

The request may be for changing the rate at which signals are transmitted by the another apparatus. The request may be for changing the another apparatus from being in a first state in which the signals are transmitted, at a first rate, by the another apparatus, to being in a second state in which signals are transmitted, at a second rate, by the another apparatus.

The signals may be for establishing the wireless communication link, according to the second communication protocol, between the apparatus and the another apparatus. The signals may be beacons.

The method may further comprise: receiving a signal, transmitted according to the second communication protocol, from the another apparatus.

The method may further comprise: establishing, in response to receiving the signal from the another apparatus, a wireless communication link with the another apparatus.

The further apparatus may be a node of a first network, the another apparatus may be a node of a second network, and the first and second networks may be different networks that use different communication protocols. The first network may be a wide area network and the second network may be a local area network.

According to various, but not necessarily all, embodiments of the invention there is provided a computer program comprising computer program instructions that, when executed by a processor, enable an apparatus to transmit a request to a further apparatus, the request being transmitted according to a first communication protocol and being for assisting a wireless communication link, according to a second communication protocol, to be established between the apparatus and another apparatus.

The computer program may be stored by a tangible computer readable medium.

The request may be for changing the rate at which signals are transmitted by the another apparatus. The request may be for changing the another apparatus from being in a first state in which the signals are transmitted, at a first rate, by the another apparatus, to being in a second state in which signals are transmitted, at a second rate, by the another apparatus.

The signals may be for establishing the wireless communication link, according to the second communication protocol, between the apparatus and the another apparatus. The signals may be beacons.

The computer program instructions may further enable the apparatus to receive a signal, transmitted according to the second communication protocol, from the another apparatus.

The computer program instructions may further enable the apparatus to establish, in response to receiving the signal from the another apparatus, a wireless communication link with the another apparatus.

The further apparatus may be a node of a first network, the another apparatus may be a node of a second network, and the first and second networks may be different networks that use different communication protocols. The first network may be a wide area network and the second network may be a local area network.

According to various, but not necessarily all, embodiments of the invention there is provided an apparatus, comprising: means for controlling transmitting means to transmit, according to a first communication protocol, a request to a further apparatus, the request being for assisting a wireless communication link, according to a second communication protocol, to be established between the apparatus and another apparatus.

The apparatus may comprise receiving means for receiving signals transmitted according to the second communication protocol.

The signals may be for establishing the wireless communication link, according to the second communication protocol, between the apparatus and the another apparatus. The apparatus may further comprise means for controlling, in response to receiving a signal transmitted according to the second communication protocol, transceiver means to establish the wireless communication link with the another apparatus.

BRIEF DESCRIPTION OF THE DRAWINGS

For a better understanding of various examples of embodiments of the present invention reference will now be made by way of example only to the accompanying drawings in which:

FIG. 6 illustrates signals transmitted by the third apparatus.

DETAILED DESCRIPTION OF VARIOUS EMBODIMENTS OF THE INVENTION

Figure 1:
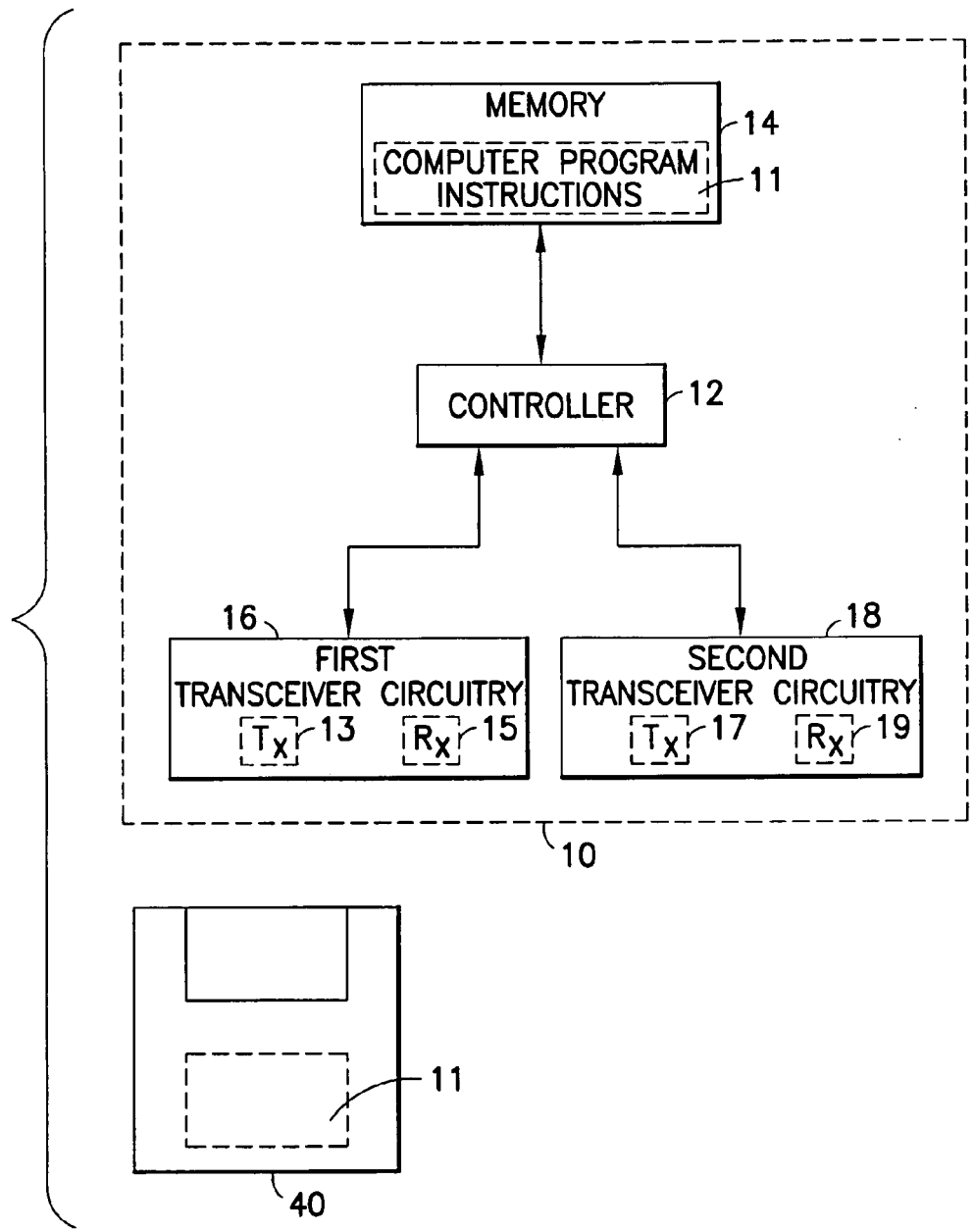
FIG. 1 illustrates a schematic of a first apparatus.

The Figures illustrate a first, second and third apparatuses 10, 20 and 30. The illustrated first apparatus 10 comprises: a controller 12 configured to control transmitter circuitry 13 to transmit, according to a first communication protocol, a first request 110 to the second apparatus 20, the first request 110 being for assisting a wireless communication link, according to a second communication protocol, to be established between the first apparatus 10 and the third apparatus 30.

The illustrated second apparatus 20 comprises: a controller 22 configured, in response to receipt of the first request 110 relating to establishing a wireless communication link between the first apparatus 10 and the third apparatus 30, to control transmitter circuitry 27 to transmit a second request 120 to the third apparatus 30, in order to cause the third apparatus 30 to change a rate at which signals 130 are wirelessly transmitted by the third apparatus 30, each signal 131-137 being for enabling a wireless communication link to be established between the first apparatus 10 and the third apparatus 30.

The illustrated third apparatus 30 comprises: a controller 32 configured to control wireless transmitter circuitry 37 to wirelessly transmit signals 130 at a rate, each signal 131-137 being for enabling a wireless communication link to be established between the third apparatus 30 and the first apparatus 10; and the controller 32 being configured, in response to receipt of the second request 120 from the second apparatus 20, to control the wireless transmitter circuitry 37 to change the rate at which the signals 130 are wirelessly transmitted by the wireless transmitter circuitry 33.

FIG. 1 illustrates a first apparatus 10. The first apparatus 10 may be an electronic apparatus. The first apparatus may, for example, be a hand portable electronic apparatus.

The first apparatus 10 comprises a controller 12, a memory 14, first transceiver circuitry 16 and second transceiver circuitry 18. The first apparatus 10 may further comprise a housing that houses the controller 12, the memory 14, the first transceiver circuitry 16 and the second transceiver circuitry 18.

The controller 12 is configured to receive inputs from the first and second transceiver circuitry 16, 18 and to provide outputs to the first and second transceiver circuitry 16, 18. The controller 12 is also configured to read from and to write to the memory 14.

The first transceiver circuitry 16 is configured to transmit and receive signals in a first network, according to a first communication protocol. The first network may, for example, be a wide area network such as a cellular mobile telephone network. The first communication protocol may, for example, be a GSM (Global Systems for Systems for Mobile Telecommunications), CDMAOne, UMTS (Universal Mobile Telecommunications System), HSPA (High Speed Packet Access), CDMA2000, or 3GPP LTE (3$^{rd}$ Generation Partnership Project Long Term Evolution) protocol.

The first transceiver circuitry 16 is illustrated as comprising first transmitter circuitry 13 and first receiver circuitry 15. It will be apparent to those skilled in the art that some or all of the components of the first transmitter circuitry 13 may be shared with the first receiver circuitry 15, and vice-versa.

The second transceiver circuitry 18 is configured to transmit and receive signals in a second network. The first and second networks are different in that they use different communication protocols to communicate data. The second network, may, for example be a local area network operating in accordance with an IEEE (Institute of Electrical and Electronics Engineers) 802.11 or 802.16 communication protocol or a Bluetooth communication protocol. Alternatively, the second network could be a wide area network such as a cellular mobile telephone network operating in accordance with a GSM, CDMAOne, UMTS, HSPA, CDMA2000, or 3GPP LTE protocol.

The second transceiver circuitry 18 is illustrated as comprising second transmitter circuitry 17 and second receiver circuitry 19. It will be apparent to those skilled in the art that some or all of the components of the second transmitter circuitry 17 may be shared with the second receiver circuitry 19, and vice-versa. It will also be apparent that some or all of the components of the second transceiver circuitry 18 may be shared with the first transceiver circuitry 16, and vice-versa.

The implementation of the controller 12 can be in hardware alone (a circuit, a processor . . . ), have certain aspects in software including firmware alone or can be a combination of hardware and software (including firmware).

The controller 12 may be implemented using instructions that enable hardware functionality, for example, by using executable computer program instructions in a general-purpose or special-purpose processor that may be stored on a computer readable storage medium (disk, memory etc) to be executed by such a processor.

The memory 14 stores a computer program comprising computer program instructions 11 that control the operation of the first apparatus 10 when loaded into the controller 12. The computer program instructions 11 provide the logic and routines that enable the first apparatus 10 to perform aspects of the method illustrated in FIGS. 4 and 5. The controller 12 by reading the memory 14 is able to load and execute the computer program.

Although the memory 14 is illustrated as a single component it may be implemented as one or more separate components some or all of which may be integrated/removable and/or may provide permanent/semi-permanent/dynamic/cached storage.

The computer program may arrive at the first apparatus 10 via any suitable delivery mechanism 40. The delivery mechanism 40 may be, for example, a computer-readable storage medium, a computer program product, a memory device, a record medium such as a CD-ROM or DVD, an article of manufacture that tangibly embodies the computer program. The delivery mechanism 40 may be a signal configured to reliably transfer the computer program. The first apparatus 10 may propagate or transmit the computer program as a computer data signal.

The elements 12, 14, 16 and 18 of the first apparatus 10 are operationally coupled and any number or combination of intervening elements can exist (including no intervening elements).

Figure 2:
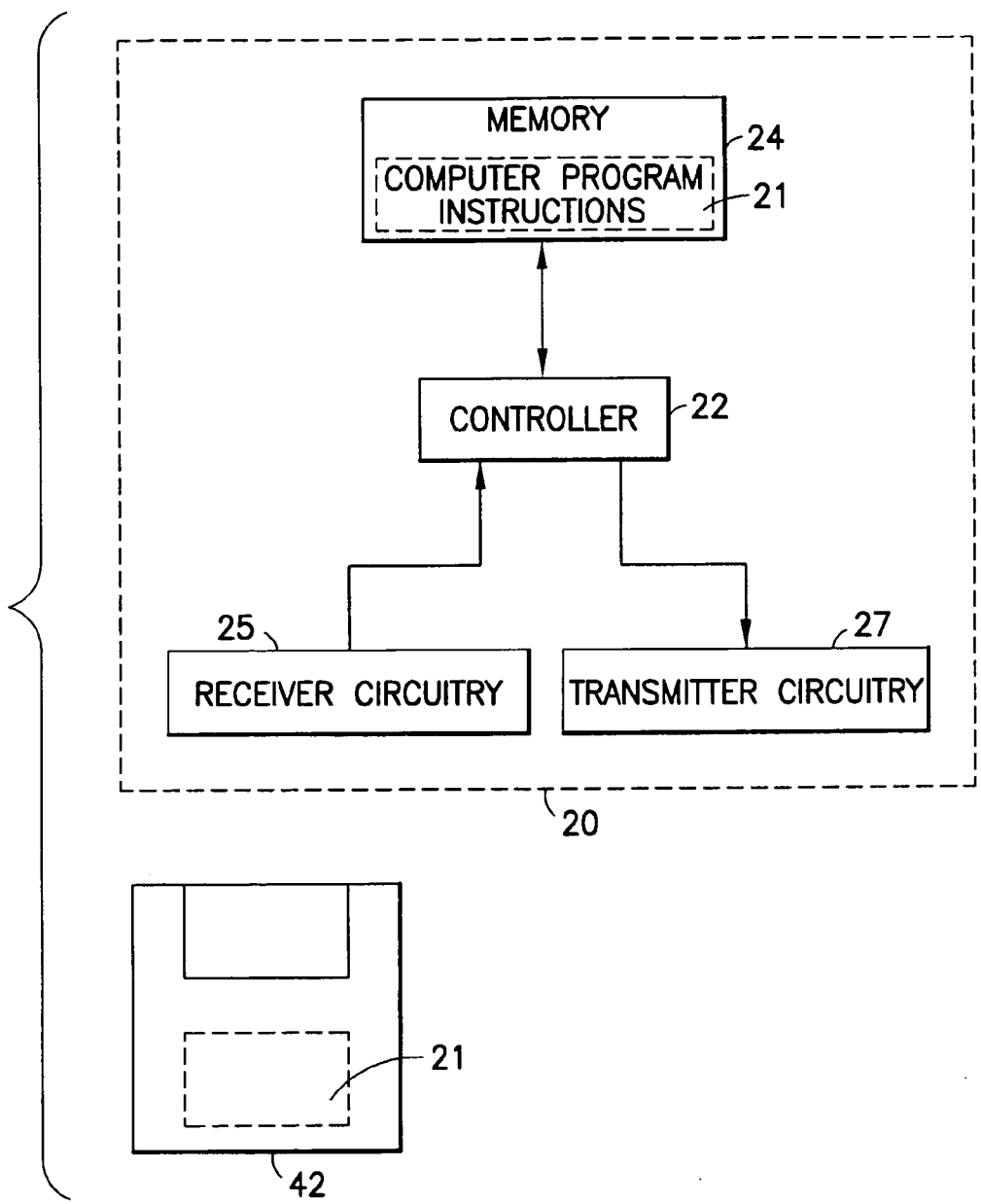
FIG. 2 illustrates a schematic of a second apparatus.

FIG. 2 illustrates a second apparatus 20. The second apparatus 20 may be an electronic apparatus. Some or all of the components of the second apparatus 20 may form a node of the first network that operates in accordance with the first communication protocol. For example, some or all of the components of the second apparatus 20 may form a base station of the first network.

As mentioned above, the first network may, for example, be a wide area network, such as a cellular mobile telephone network operating in accordance with a GSM, CDMAOne, UMTS, HSPA, CDMA2000, or 3GPP LTE protocol.

The second apparatus 20 comprises a controller 22, a memory 24, receiver circuitry 25 and transmitter circuitry 27. The controller 22 is configured to receive an input from the receiver circuitry 25 and configured to provide an output to the transmitter circuitry 27. The controller 22 is also configured to read from and to write to the memory 24.

The receiver circuitry 25 may be configured to receive signals in the first network, according to the first communication protocol.

The transmitter circuitry 27 may be configured to transmit signals in a third network. The third network may be different to both the first network and the second network and may use a third communication protocol. The third network, may, for example, be the internet. The transmitter circuitry 27 of the second apparatus 20 may therefore be configured to transmit signals according to the Internet Protocol Suite.

The implementation of the controller 22 can be in hardware alone (a circuit, a processor . . . ), have certain aspects in software including firmware alone or can be a combination of hardware and software (including firmware).

The controller 22 may be implemented using instructions that enable hardware functionality, for example, by using executable computer program instructions in a general-purpose or special-purpose processor that may be stored on a computer readable storage medium (disk, memory etc) to be executed by such a processor.

The memory 24 stores a computer program comprising computer program instructions 21 that control the operation of the second apparatus 20 when loaded into the controller 22. The computer program instructions 21 provide the logic and routines that enable the second apparatus 20 to perform aspects of the method illustrated in FIGS. 4 and 5. The controller 22 by reading the memory 24 is able to load and execute the computer program.

Although the memory 24 is illustrated as a single component it may be implemented as one or more separate components some or all of which may be integrated/removable and/or may provide permanent/semi-permanent/dynamic/cached storage.

The computer program may arrive at the second apparatus 20 via any suitable delivery mechanism 42. The delivery mechanism 42 may be, for example, a computer-readable storage medium, a computer program product, a memory device, a record medium such as a CD-ROM or DVD, an article of manufacture that tangibly embodies the computer program. The delivery mechanism 42 may be a signal configured to reliably transfer the computer program. The second apparatus 20 may propagate or transmit the computer program as a computer data signal.

The elements 22, 24, 25 and 27 of the second apparatus 20 are operationally coupled and any number or combination of intervening elements can exist (including no intervening elements).

Figure 3:
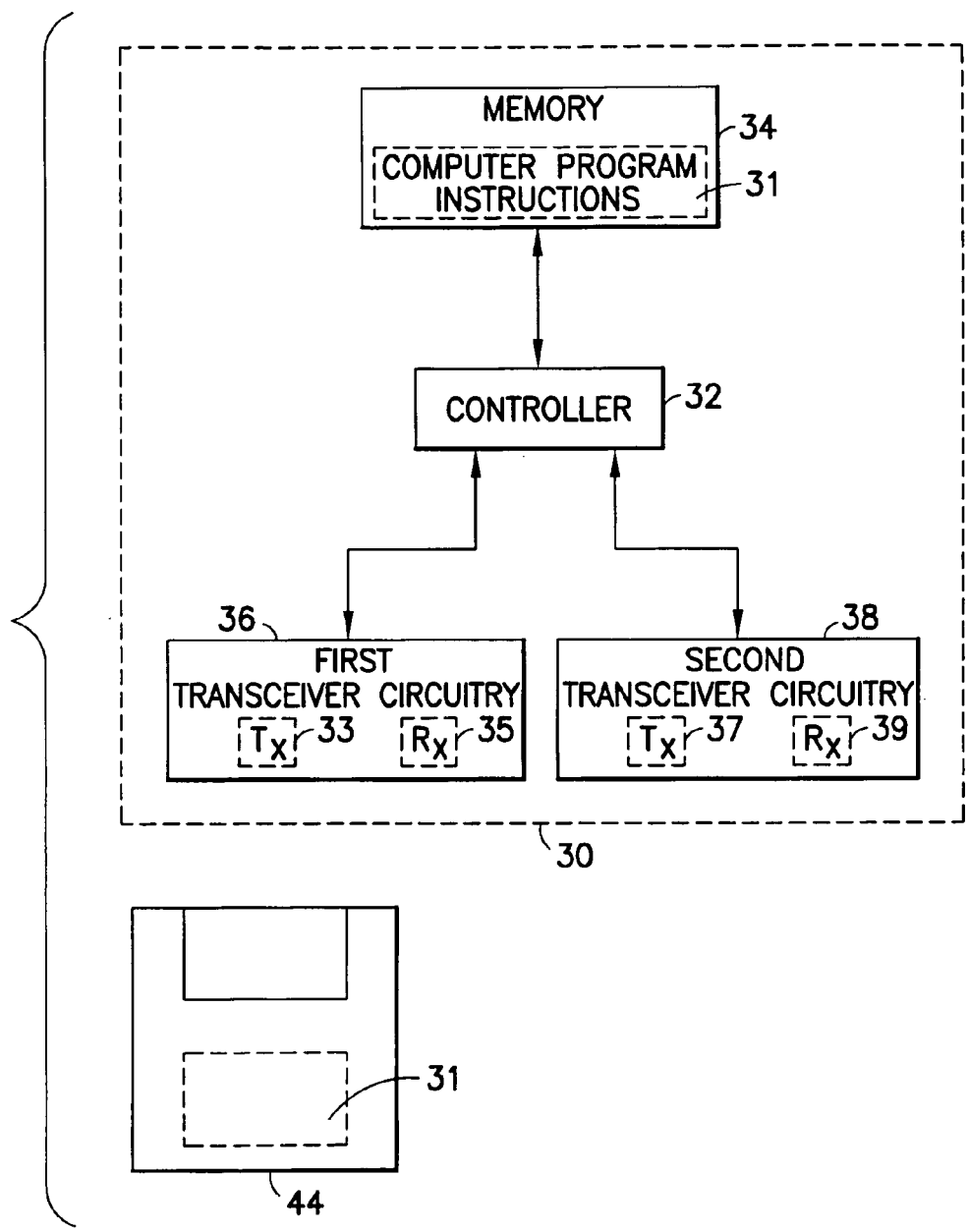
FIG. 3 illustrates a schematic of a third apparatus.

FIG. 3 illustrates a third apparatus 30. The third apparatus 30 may be an electronic apparatus. The third apparatus 30 may, for example, be a node of the second network and a node of the third network.

The third apparatus 30 comprises a controller 32, a memory 34, first transceiver circuitry 36 and second transceiver circuitry 38. The third apparatus 30 may further comprise a housing that houses the controller 32, the memory 34, the first transceiver circuitry 36 and the second transceiver circuitry 38.

The controller 32 is configured to receive inputs from the first and second transceiver circuitry 36, 38 and provide outputs to the first and second transceiver circuitry 36, 38. The controller 32 is also configured to read from and to write to the memory 34.

The first transceiver circuitry 36 is configured to transmit and receive signals in the third network, according to the third communication protocol. As indicated above, the third network may, for example, be the internet. The first transceiver circuitry 36 of the third apparatus 30 may therefore be configured to transmit and receive signals according to the Internet Protocol Suite.

The first transceiver circuitry 36 is illustrated as comprising first transmitter circuitry 33 and first receiver circuitry 35. It will be apparent to those skilled in the art that some or all of the components of the first transmitter circuitry 33 may be shared with the first receiver circuitry 35, and vice-versa.

The second transceiver circuitry 38 is configured to transmit and receive signals in the second network using the second communication protocol. As mentioned above, the second network may, for example be a local area network operating in accordance with an IEEE WLAN 802.11 or 802.16 communication protocol or a Bluetooth communication protocol. Alternatively, the second network could be a wide area network such as a cellular mobile telephone network operating in accordance with a GSM, CDMAOne, UMTS, HSPA, CDMA2000, or 3GPP LTE protocol.

The second transceiver circuitry 38 is illustrated as comprising second transmitter circuitry 37 and second receiver circuitry 39. It will be apparent to those skilled in the art that some or all of the components of the second transmitter circuitry 37 may be shared with the second receiver circuitry 39, and vice-versa.

The implementation of the controller 32 can be in hardware alone (a circuit, a processor . . . ), have certain aspects in software including firmware alone or can be a combination of hardware and software (including firmware).

The controller 32 may be implemented using instructions that enable hardware functionality, for example, by using executable computer program instructions in a general-purpose or special-purpose processor that may be stored on a computer readable storage medium (disk, memory etc) to be executed by such a processor.

The memory 34 stores a computer program comprising computer program instructions 31 that control the operation of the third apparatus 30 when loaded into the controller 32. The computer program instructions 31 provide the logic and routines that enable the third apparatus 30 to perform aspects of the method illustrated in FIGS. 4 and 5. The controller 32 by reading the memory 34 is able to load and execute the computer program.

Although the memory 34 is illustrated as a single component it may be implemented as one or more separate components some or all of which may be integrated/removable and/or may provide permanent/semi-permanent/dynamic/cached storage.

The computer program may arrive at the third apparatus 30 via any suitable delivery mechanism 44. The delivery mechanism 44 may be, for example, a computer-readable storage medium, a computer program product, a memory device, a record medium such as a CD-ROM or DVD, an article of manufacture that tangibly embodies the computer program. The delivery mechanism 44 may be a signal configured to reliably transfer the computer program. The third apparatus 30 may propagate or transmit the computer program as a computer data signal.

The elements 32, 34, 36 and 38 of the third apparatus 30 are operationally coupled and any number or combination of intervening elements can exist (including no intervening elements).

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

An exemplary method according to embodiments of the invention will now be described in relation to FIGS. 4, 5 and 6.

Figure 4:
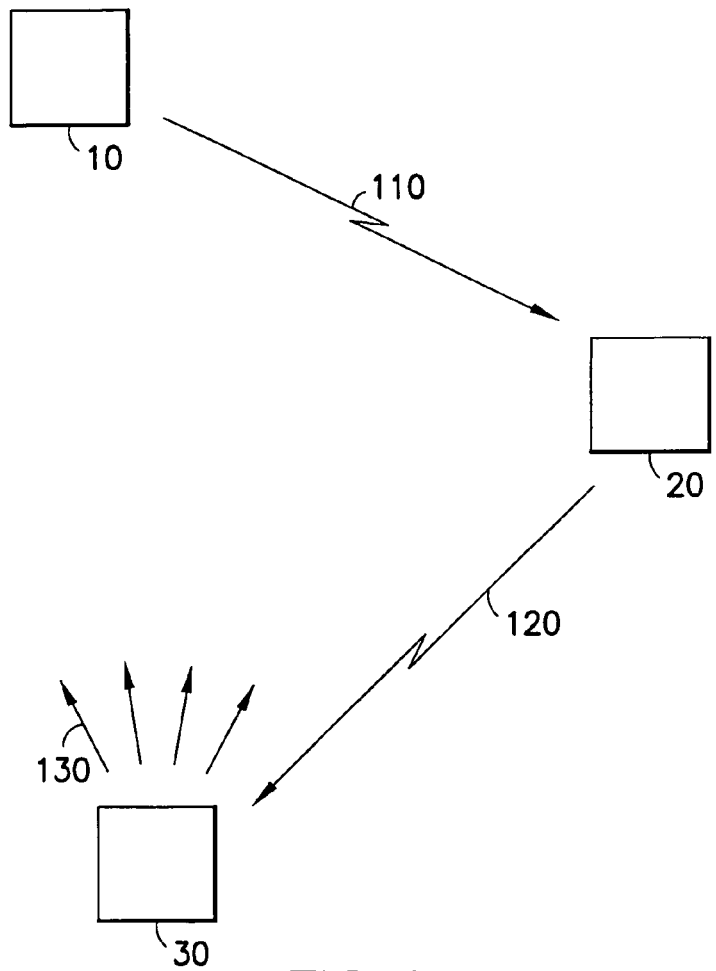
FIG. 4 illustrates the first, second and third apparatuses.

FIG. 4 illustrates the first apparatus 10, the second apparatus 20 and the third apparatus 30. In this exemplary method, the first network is a wide area wireless cellular network. In this case, the first apparatus 10 is configured to communicate with the second apparatus 20 using a wireless cellular communication protocol. The first apparatus 10 may, for example, be a hand portable apparatus. All or part of the second apparatus 20 may form an access point/node of the wide area cellular network, such as a base station.

In this example, the second network is a IEEE WLAN 802.11 network. The first apparatus 10 is configured to communicate with the third apparatus 30 using an IEEE WLAN 802.11 communication protocol. The third apparatus 30 may, for example, be a WLAN access point.

The third network in this example is the internet. The second apparatus 20 may therefore be configured to communicate with the third apparatus 30 using the Internet Protocol Suite.

The first apparatus 10 establishes a wireless communication link with the second apparatus 20 using the first transceiver circuitry 16 of the first apparatus 10. A user of the first apparatus 10 then decides that he wishes to connect to the internet via an access point other than the second apparatus 20. For example, the user may decide that he wishes to connect to the internet using a WLAN access point (such as the third apparatus 30) because it offers a faster connection speed and/or is cheaper than using the cellular network.

The third apparatus 30 periodically transmits signals 130 that enable a wireless communication link to be established between the third apparatus 30 and another apparatus (such as the first apparatus 10). The signals may be broadcast, so that any apparatus having compatible receiver circuitry may receive the signals. For example, the signals may be beacons.

The signals may include one or more parameters that enable a wireless communications link to be established between the third apparatus 30 and another apparatus. For example, the signals 130 may include data identifying the third apparatus 30 and/or data that enables another apparatus to synchronize with the third apparatus 30.

If the third apparatus 30 is a WLAN access point 30, as is the case in this example, each of the periodically transmitted signals 130 may be a beacon frame. A beacon frame includes an SSID (Service Set Identifier) and/or a BSSID (Basic Service Set Identifier) that identifies the transmitting WLAN access point and a timestamp value that enables other apparatuses to synchronize with the transmitting WLAN access point.

Figure 5:
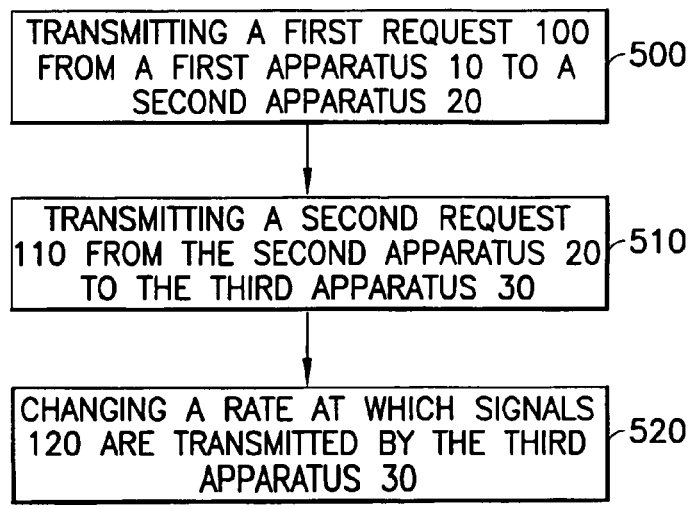
FIG. 5 illustrates a method.

At block 500 of FIG. 5, the controller 12 of the first apparatus 10 controls the first transmitter circuitry 13 to transmit a first request 110 to the second apparatus 20 using the existing communication link between the first apparatus 10 and the second apparatus 20. The first request 110 contains data which indicates that the first apparatus 10 wants assistance from the first cellular network to connect to the internet via a WLAN access point.

In some embodiments of the invention, the first request 110 includes data that indicates which WLAN access point(s) the first apparatus 10 wishes to connect to. The data may, for instance, identify the WLAN access point by specifying its SSID, its BSSID and/or its IP (Internet Protocol) address.

For example, the WLAN access point 30 illustrated in FIG. 4 may be located in a user's home or office, and the first request 110 may indicate that the first apparatus 10 wishes to connect to the internet using that WLAN access point 30.

The first apparatus 110 may be aware of the SSID, BSSID and/or the IP address of the WLAN access point(s) identified in the first request 110 because it has previously established a connection with that/those access points. Alternatively or additionally, the WLAN access points identified in the first request 110 may have been determined by the first apparatus 10 performing a scan. The scan may, for example, be an active scan in which the first apparatus 10 transmits Probe.Request frames and receives Probe.Request frames in response which identify local WLAN access points.

In other embodiments of the invention, the first request 110 does not include data that indicates which particular WLAN access point(s) the first apparatus 10 wishes to connect to. Instead, a determination of potential WLAN access points that are local to the first apparatus 10 is made. This can be done in several different ways. For example, the first apparatus 10 may determine its location, for instance by using a satellite positioning receiver or by determining the Cell ID of a base station that it is communicating with in the cellular network (such as the second apparatus 20).

The first apparatus 10 may transmit its location to the second apparatus 20 as data in (or along with) the first request 110. Alternatively or additionally, the position of the first apparatus 10 may be determined by the cellular network (for instance, by the second apparatus 20).

The controller 22 of the second apparatus 20 may use the position of the first apparatus 10 to determine which WLAN access points are within range for the first apparatus 10.

Optionally, the second apparatus 20 may comprise transmitter circuitry to transmit a message to the first apparatus 10 in the cellular network, in reply to the first request 110. The reply message may identify the WLAN access point(s) that has/have been identified as being within range. It may also provide details of the identified WLAN access point(s). Those details may include information that may be used by the first apparatus 10 to establish a wireless communication link with the third apparatus 30.

For example, the reply message may indicate the position(s) of the identified WLAN access point(s), the operational frequency/frequencies of the identified WLAN access point(s), the delay (if any) that is expected before the identified WLAN access point(s) become available, the rate at which the WLAN access point(s) transmit(s) beacon frames, timing information relating to when the WLAN access point(s) is/are available and/or the current capacity of the identified WLAN access point(s).

In this example, the controller 22 of the second apparatus 20 identifies the WLAN access point 30 illustrated in FIG. 4 as being a relevant WLAN access point after receiving the first request 110. In some embodiments of the invention, more than one WLAN access point may be identified as being relevant.

At block 510 of FIG. 5, the controller 22 of the second apparatus 20 controls the transmitter circuitry 27 to transmit a second request 120, over the internet, to the WLAN access point 30.

The second request 120 is received by the first receiver circuitry 35 of the WLAN access point 30. The second request 120 may be received and forwarded by one or more other apparatuses, intermediate the second apparatus 20 and the WLAN access point 30, prior to reception of the second request 120 by the WLAN access point 30.

At block 520 of FIG. 5, in response to the second request 120 being received at the WLAN access point 30, the controller 32 of the WLAN access point 30 controls the second transmitter circuitry 37 to change the rate at which beacon frames 130 are transmitted by the second transmitter circuitry 37 of the WLAN access point 30.

FIG. 6 illustrates a time line showing beacon frames 131-137 transmitted by the WLAN access point 30. After each beacon frame 131-137 is transmitted by the WLAN access point 30, the second receiver circuitry 39 of the WLAN access point listens for a response for a time period 141-147. When the WLAN is transmitting or receiving (or scheduled to receive) it can be considered to be in an "active mode".

If the WLAN access point 30 is not transmitting or receiving (or scheduled to receive), it may temporarily enter a "sleep mode" until it is next scheduled to transmit or receive. The WLAN access point 30 consumes less power when it is in the sleep mode than when it is in the active mode.

Prior to receipt of second request 120 by the WLAN access point 30, the second transmitter circuitry 37 is in a first state in which it transmits beacon frames periodically at a first rate. For instance, the time period between beacon frame transmissions when the second transmitter circuitry 37 is in the first state may be 500 ms (illustrated as $T_1$ in FIG. 6).

After receipt of the second request 120 by the WLAN access point 30, the controller 32 of the WLAN access point 30 controls the second transmitter circuitry 37 to change it from being in the first state to being in a second state, in which the second transmitter circuitry 37 transmits beacon frames at a second rate. In this example, the second rate is faster than the first rate. For instance, the time period between beacon frame transmissions when the second transmitter circuitry 37 is in the second state may be 100 ms (illustrated as $T_2$ in FIG. 6).

Meanwhile, after the first apparatus 10 has transmitted the first request 110 to the second apparatus 20, the controller 12 of the first apparatus 10 controls the second receiver circuitry 19 to begin scanning for WLAN beacon frames.

Once a beacon frame (transmitted by the WLAN access point 30) is received by the first apparatus 10, the second transceiver circuitry 18 may use the received beacon frame to confirm the availability of the WLAN access point 30 and may then establish a bi-directional wireless communications link with the WLAN access point 30.

If details of the WLAN access point 30 were provided to the first apparatus 10 by the second apparatus 20 (in a reply message to the first request 110), the second transceiver circuitry 18 may use those details when scanning for beacon frames and/or when establishing the bi-directional wireless communication link with the WLAN access point 30.

After a wireless communication link between the first apparatus 10 and the WLAN access point 30 has been established, the first apparatus 10 may transmit information to the second apparatus 20 indicating that the communication link has been established. In response to receiving that information, the second apparatus 20 may transmit a third request to the WLAN access point 30 instructing it to revert back to being in the first state. Alternatively, the WLAN access point 30 may revert back to being in the first state after being in the second state for a certain duration of time.

Advantageously, the time taken for the first apparatus 10 to receive a beacon frame and establish a wireless communications link with the WLAN access point 30 while the WLAN access point 30 is transmitting beacon frames at the second (increased) rate is likely to be less than if the WLAN access point 30 had continued transmitting beacon frames at the first rate.

The embodiments of the invention described above therefore advantageously enable the first apparatus 10 to form a wireless communication link with the third apparatus 30 more quickly by using an existing communication link that the first apparatus 10 has with the second apparatus 20.

Also, embodiments of the invention may advantageously be used to conserve power. This is because the WLAN access point 30 may remain in a "low power" first state (in which beacon frames are transmitted relatively infrequently) until it is notified that an apparatus wishes to establish a communications link with it, at which point it may change from being in the "low power" first state to being in a second state in which beacon frames are transmitted more frequently.

The blocks illustrated in FIG. 4 may represent steps in a method and/or sections of code in the computer programs stored in the memories 14, 24, 34. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. For example, the first request 110 and the second request 120 may relate to decreasing (rather than increasing) the rate at which signals (such as beacons) are transmitted by the third apparatus 30.

Also, in response to receipt of the second request 120 at the third apparatus 30, the format in which the signals (such as beacons) are transmitted by the third apparatus 30 may be changed (in addition to changing the rate at which signals are transmitted by the third apparatus 30), to enable easier detection of those signals by the first apparatus 10.

While the third apparatus 30 is mentioned in the method described above as being a WLAN 802.11 "access point", that need not be the case. For instance, the third apparatus 30 may be mesh station (Mesh STA) in a WLAN 802.11 Mesh Network.

The third apparatus 30 may be function as a both WLAN access point and a WLAN mesh station. In this case, the third apparatus 30 may broadcast infrastructure beacon frames and mesh beacon frames alternatively.

As mentioned above, in some embodiments of the invention, the third apparatus 30 may operate according to a different communication protocol to the IEEE WLAN 802.11 protocols. For example, the third apparatus 30 may operate according to a 3GPP LTE protocol. In this case, the signals 130 that are transmitted by the second transmitter circuitry 37 of the third apparatus 30 which are for establishing a wireless communication link with another apparatus may be transmissions made on a broadcast channel (BCH) and/or transmissions made on a synchronization channel.

The transmissions made on the broadcast channel may, for example, identify the network that the transmissions are being made in (such as by including an operator or network ID), and may include other information relating to the currently utilized bandwidth, multi-antenna configurations, frame numbers, etc.

In some embodiments of the invention, the broadcast channel may be split into primary and secondary broadcast channels.

In the method described above in relation to FIGS. 4, 5 and 6, the first request 110 is transmitted by the first apparatus 10, in a first network, to request assistance in establishing a wireless communication link with an access point in a second network. The process of transmitting the first request 110 may be automatic and the user of the first apparatus 10 may not be aware that it has occurred. For example, the controller 12 of the first apparatus 10 may be configured to control the first transmitter circuitry 13 to transmit a request corresponding to the first request 110 whenever a user instructs the second receiver circuitry 19 to scan for available access points in the second network. In some embodiments of the invention, the first request 110 may merely be a request for assistance in establishing a wireless communication link. Alternatively, in other embodiments of the invention, the first request 110 may include data that explicitly instructs an access point to change (increase or decrease) the rate at which signals (such as beacon frames) are transmitted. In these embodiments of the invention, the second request 120 may include the same data. That is, the second apparatus 20 may effectively act as a conduit via which the first apparatus 10 sends the first request 110 to one or more relevant access points in the second network.

Prior to or at the same time as transmitting the first request 110, the first apparatus 10 may transmit a service discovery request to the second apparatus 20, to determine which networks and services are available in the area in which the first apparatus 10 is located. The communication protocol used for the service discovery request could, for example, be Universal Plug in and Play (uPnP) or Zero Configuration Networking (ZeroConf).

The second apparatus 20 may respond to the service discovery request with a list of services or networks that are available in the area in which the first apparatus 10 is located.

In the embodiments of the invention described above in relation to the figures, the first apparatus 10 transmits the first request 110 to the second apparatus 20 using a first communication protocol (such as a mobile cellular communication protocol). As mentioned above, some or all of the components of the second apparatus 20 may form a node of the first network that operates in accordance with the first communication protocol. The second apparatus 20 receives the first request 110 from the first apparatus 10 and transmits a second request 120 to the third apparatus 30 using a third communication protocol (such as the Internet Protocol Suite).

In some alternative embodiments of the invention, the second apparatus 20 may not form a node of the first network. For example, the first apparatus 10 may transmit a first request 110 using a first communication protocol and an apparatus, intermediate the first apparatus 10 and the third apparatus 30, may convert the first request 110 from the first communication protocol to the third communication protocol, before providing the first request 110 to the second apparatus 20. The second apparatus 20 therefore receives the first request 110 indirectly (via the intermediate apparatus) from the first apparatus 10. The intermediate apparatus may, for example, be a node in the first network.

In these embodiments of the invention, the "first request 110" that is received by the second apparatus 20 is formulated according to the third communication protocol (such as the Internet Protocol Suite). The second request 120 may be transmitted by the second apparatus 20 according to the third communication protocol. The second apparatus 20 may therefore be a server with an Internet connection.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

According to various, but not necessarily all, embodiments of the invention there is provided an apparatus, comprising: a controller configured to control wireless transmitter circuitry to wirelessly transmit signals at a rate, each signal being for enabling a wireless communication link to be established between the apparatus and a further apparatus; and the controller being configured, in response to receipt of a request from another apparatus, to control the wireless transmitter circuitry to change the rate at which the signals are wirelessly transmitted by the wireless transmitter circuitry.

The controller may be configured, in response to receipt of the request from the another apparatus, to control the wireless transmitter circuitry to increase the rate at which the signals are wirelessly transmitted by the wireless transmitter circuitry.

The controller may be configured to control the wireless transmitter circuitry to change the wireless transmitter circuitry from being in a first state in which the signals are transmitted at a first rate, to being in a second state in which the signals are transmitted at a second rate.

Each of the transmitted signals may be for enabling a further apparatus to synchronize with the apparatus.

Each of the transmitted signals may include data identifying the apparatus.

The apparatus be a node of a first network, the another apparatus may be a node of a second network, and the first network and the second network may be different networks that use different communication protocols.

The first network may be a local area network and the second network may be a wide area network.

The apparatus may further comprise the wireless transmitter circuitry and receiver circuitry configured to receive the request from the another apparatus.

According to various, but not necessarily all, embodiments of the invention there is provided a method, comprising: controlling signals to be wirelessly transmitted at a rate, each signal being for enabling a wireless communication link to be established between an apparatus and a further apparatus; and changing, in response to reception of a request, the rate at which the signals are wirelessly transmitted.

In response to reception of the request, the rate at which the signals are wirelessly transmitted may be increased.

Prior to reception of the request, the signals may be transmitted at a first rate, and, after receipt of the request, the signals may be transmitted at a second rate.

Each of the transmitted signals may be transmitted by the apparatus and the request may be received from another apparatus.

Each of the transmitted signals may be for enabling a further apparatus to synchronize with the apparatus.

Each of the transmitted signals may include data identifying the apparatus.

The signals may be transmitted by a node of a first network, the request may be received from a second network, and the first network and the second network may be different networks that use different communication protocols.

The first network may be a local area network and the second network may be a wide area network.

According to various, but not necessarily all, embodiments of the invention there is provided a computer program comprising computer program instructions that, when executed by a processor, enable: transmitting wireless signals at a rate, each wireless signal being for enabling a wireless communication link to be established between an apparatus and a further apparatus; and changing, in response to reception of a request, the rate at which the wireless signals are transmitted.

The computer program may be stored by a tangible computer readable medium.

In response to reception of the request, the rate at which the wireless signals are transmitted may be increased.

Prior to reception of the request, the wireless signals may be transmitted at a first rate, and, after receipt of the request, the wireless signals may be transmitted at a second rate.

Each of the wireless signals may be transmitted by the apparatus and the request may be received from another apparatus.

Each of the wireless signals may be for enabling a further apparatus to synchronize with the apparatus.

Each of the wireless signals may include data identifying the apparatus.

The wireless signals may be transmitted by a node of a first network, the request may be received from a node of a second network, and the first network and the second network may be different networks that use different communication protocols.

The first network may be a local area network. The second network may be a wide area network.

According to various, but not necessarily all, embodiments of the invention there is provided an apparatus, comprising: means for controlling wireless transmitting means to wirelessly transmit signals at a rate, each signal being for enabling a wireless communication link to be established between the apparatus and a further apparatus; and means for controlling, in response to receipt of a request from another apparatus, the wireless transmitting means to change the rate at which the signals are wirelessly transmitted by the wireless transmitting means.

According to various, but not necessarily all, embodiments of the invention there is provided an apparatus, comprising: a controller configured, in response to receipt of a first request relating to establishing a wireless communication link between a further apparatus and another apparatus, to control transmitter circuitry to transmit a second request to the another apparatus, in order to cause the another apparatus to change a rate at which signals are wirelessly transmitted by the another apparatus, each signal being for enabling a wireless communication link to be established between a further apparatus and the another apparatus.

The second request may include data instructing the another apparatus to change the rate at which the signals are wirelessly transmitted by the another apparatus.

The first request and the second request may include data instructing the another apparatus to change the rate at which the signals are wirelessly transmitted by the another apparatus.

The controller may be configured to control the transmitter circuitry to transmit the second request to the another apparatus, in order to cause the another apparatus to increase the rate at which the signals are wirelessly transmitted by the another apparatus.

The controller may be configured to control the transmitter circuitry to transmit the second request to the another apparatus, in order to cause the another apparatus to change from being in a first state in which the signals are wirelessly transmitted at a first rate, to being in a second state in which the signals are wirelessly transmitted at a second rate.

Each of the transmitted signals may be for enabling a further apparatus to synchronize with the another apparatus.

Each of the transmitted signals may include data identifying the another apparatus.

The first request may be directly or indirectly received from the further apparatus.

The apparatus may be a node of a first network, the another apparatus may be a node of a second network and the first network and the second network may be different networks that use different communication protocols. The first network may be a wide area network and the second network may be a local area network. The wide area network may be a cellular telephone network or the internet.

According to various, but not necessarily all, embodiments of the invention there is provided a method, comprising: enabling a first request to be received by an apparatus, the first request relating to establishing a wireless communication link between a further apparatus and another apparatus; and enabling transmitter circuitry to transmit, in response to receipt of the first request by the apparatus, a second request to the another apparatus, in order to cause the another apparatus to change a rate at which signals are wirelessly transmitted by the another apparatus, each signal being for enabling a wireless communication link to be established between a further apparatus and the another apparatus.

The second request may include data instructing the another apparatus to change the rate at which the signals are wirelessly transmitted by the another apparatus.

The first request and the second request may include data instructing the another apparatus to change the rate at which the signals are wirelessly transmitted by the another apparatus.

The second request may be transmitted to the another apparatus in order to cause the another apparatus to increase the rate at which the signals are wirelessly transmitted by the another apparatus.

The second request may be transmitted to the another apparatus in order to cause the another apparatus to change from being in a first state in which the signals are wirelessly transmitted at a first rate, to being in a second state in which the signals are wirelessly transmitted at a second rate.

Each of the transmitted signals may be for enabling a further apparatus to synchronize with the another apparatus.

Each of the transmitted signals may include data identifying the another apparatus.

The first request may be directly or indirectly received from the further apparatus.

The apparatus may be a node of a first network, the another apparatus may be a node of a second network and the first network and the second network may be different networks that use different communication protocols. The first network may be a wide area network and the second network may be a local area network. The wide area network may be a cellular telephone network or the internet.

According to various, but not necessarily all, embodiments of the invention there is provided a computer program comprising computer program instructions that, when executed by a processor, enable: receiving a first request at an apparatus, the first request relating to establishing a wireless communication link between a further apparatus and another apparatus; and controlling, in response to receipt of the first request by the apparatus, transmitter circuitry to transmit a second request to the another apparatus, in order to cause the another apparatus to change a rate at which signals are wirelessly transmitted by the another apparatus, each signal being for enabling a wireless communication link to be established between a further apparatus and the another apparatus.

The computer program may be stored by a tangible computer readable medium.

The second request may include data instructing the another apparatus to change the rate at which the signals are wirelessly transmitted by the another apparatus.

The first request and the second request may include data instructing the another apparatus to change the rate at which the signals are wirelessly transmitted by the another apparatus.

The second request may be transmitted to the another apparatus in order to cause the another apparatus to increase the rate at which the signals are wirelessly transmitted by the another apparatus.

The second request may be transmitted to the another apparatus in order to cause the another apparatus to change from being in a first state in which the signals are wirelessly transmitted at a first rate, to being in a second state in which the signals are wirelessly transmitted at a second rate.

Each of the transmitted signals may be for enabling a further apparatus to synchronize with the another apparatus.

Each of the transmitted signals may include data identifying the another apparatus.

The first request may be directly or indirectly received from the further apparatus.

The apparatus may be a node of a first network, the another apparatus may be a node of a second network and the first network and the second network may be different networks that use different communication protocols. The first network may be a wide area network and the second network may be a local area network. The wide area network may be a cellular telephone network or the internet.

According to various, but not necessarily all, embodiments of the invention there is provided an apparatus, comprising: means for controlling, in response to receipt of a first request relating to establishing a wireless communication link between a further apparatus and another apparatus, transmitting means to transmit a second request to the another apparatus, in order to cause the another apparatus to change a rate at which signals are wirelessly transmitted by the another apparatus, each signal being for enabling a wireless communication link to be established between a further apparatus and the another apparatus.

According to various, but not necessarily all, embodiments of the invention there is provided an apparatus, comprising: a controller configured to control transmitter circuitry to transmit, according to a first communication protocol, a request to a further apparatus, the request being for assisting a wireless communication link, according to a second communication protocol, to be established between the apparatus and another apparatus.

The request may be for changing the rate at which signals are transmitted by the another apparatus.

The request may be for changing the another apparatus from being in a first state in which the signals are transmitted, at a first rate, by the another apparatus, to being in a second state in which signals are transmitted, at a second rate, by the another apparatus.

The apparatus may comprise receiver circuitry configured to receive signals transmitted according to the second communication protocol.

The signals may be for establishing the wireless communication link, according to the second communication protocol, between the apparatus and the another apparatus. The controller may be configured, in response to receiving a signal transmitted according to the second communication protocol, to control transceiver circuitry to establish the wireless communication link with the another apparatus.

The signals may be beacons.

The further apparatus may be a node of a first network, the another apparatus may be a node of a second network, and the first and second networks may be different networks that use different communication protocols.

The first network may be a wide area network and the second network may be a local area network.

According to various, but not necessarily all, embodiments of the invention there is provided a method, comprising: enabling an apparatus to transmit a request to a further apparatus, the request being transmitted according to a first communication protocol and being for assisting a wireless communication link, according to a second communication protocol, to be established between the apparatus and another apparatus.

The request may be for changing the rate at which signals are transmitted by the another apparatus.

The request may be for changing the another apparatus from being in a first state in which the signals are transmitted, at a first rate, by the another apparatus, to being in a second state in which signals are transmitted, at a second rate, by the another apparatus.

The signals may be for establishing the wireless communication link, according to the second communication protocol, between the apparatus and the another apparatus.

The signals may be beacons.

The method may further comprise: receiving a signal, transmitted according to the second communication protocol, from the another apparatus.

The method may further comprise: establishing, in response to receiving the signal from the another apparatus, a wireless communication link with the another apparatus.

The further apparatus may be a node of a first network, the another apparatus may be a node of a second network, and the first and second networks may be different networks that use different communication protocols.

The first network may be a wide area network and the second network may be a local area network.

According to various, but not necessarily all, embodiments of the invention there is provided a computer program comprising computer program instructions that, when executed by a processor, enable an apparatus to transmit a request to a further apparatus, the request being transmitted according to a first communication protocol and being for assisting a wireless communication link, according to a second communication protocol, to be established between the apparatus and another apparatus.

The computer program may be stored by a tangible computer readable medium.

The request may be for changing the rate at which signals are transmitted by the another apparatus.

The request may be for changing the another apparatus from being in a first state in which the signals are transmitted, at a first rate, by the another apparatus, to being in a second state in which signals are transmitted, at a second rate, by the another apparatus.

The signals may be for establishing the wireless communication link, according to the second communication protocol, between the apparatus and the another apparatus.

The signals may be beacons.

The computer program instructions may further enable the apparatus to receive a signal, transmitted according to the second communication protocol, from the another apparatus.

The computer program instructions may further enable the apparatus to establish, in response to receiving the signal from the another apparatus, a wireless communication link with the another apparatus.

The further apparatus may be a node of a first network, the another apparatus may be a node of a second network, and the first and second networks may be different networks that use different communication protocols.

The first network may be a wide area network and the second network may be a local area network.

According to various, but not necessarily all, embodiments of the invention there is provided an apparatus, comprising: means for controlling transmitting means to transmit, according to a first communication protocol, a request to a further apparatus, the request being for assisting a wireless communication link, according to a second communication protocol, to be established between the apparatus and another apparatus.

The apparatus may comprise receiving means for receiving signals transmitted according to the second communication protocol.

The signals may be for establishing the wireless communication link, according to the second communication protocol, between the apparatus and the another apparatus. The apparatus may further comprise means for controlling, in response to receiving a signal transmitted according to the second communication protocol, transceiver means to establish the wireless communication link with the another apparatus.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. An apparatus, comprising at least one processor; and at least one memory including computer program code, the at least one memory and the computer program code configured to, with the at least one processor, cause the apparatus to perform at least the following:

to periodically transmit signals, where each signal is configured to enable a wireless communication link to be established between the apparatus and a first apparatus;

in response to receipt of a request from a second apparatus, to change a time period between transmission of the signals;

wherein the request is received using a first protocol and the communication link uses a second, different protocol.

2. The apparatus of claim 1, where the computer program code is further configured to cause the apparatus, when changing the time period between transmission of the signals, one of: to increase the time period between transmission of the signals and to decrease the time period between transmission of the signals.

3. The apparatus of claim 1, where the signals comprise synchronization information.

4. The apparatus of claim 1, where, when transmitting the signals at the rate, the at least one memory and the computer program code are further configured to cause the apparatus to periodically transmit the signals at intervals defined by the time periods.

5. The apparatus of claim 1, where the signals comprise beacon frames.

6. A method, comprising:

periodically transmitting signals, where each signal is configured to enable a wireless communication link to be established between the apparatus and a first apparatus; and in response to receipt of a request from a second apparatus, changing a time period between transmission of the signals, wherein the request is received using a first protocol and the communication link uses a second, different protocol.

7. The method of claim 6, where changing the time period between transmission of the signals comprises one of: increasing the time period between transmission of the signals and decreasing the time period between transmission of the signals.

8. The method of claim 6, where the signals comprise synchronization information.

9. An apparatus, comprising at least one processor; and at least one memory including computer program code, the at least one memory and the computer program code configured to, with the at least one processor, cause the apparatus to perform at least the following:

in response to receipt of a first request relating to establishing a wireless communication link between a first apparatus and a third apparatus, to transmit a second request to the third apparatus, where the request requests the third apparatus to change a time period between wireless transmission by the third apparatus of periodic signals configured to enable a wireless communication link to be established between the third apparatus and the first apparatus, wherein the at least one memory and the computer program code are further configured to, with the at least on processor, cause the apparatus to receive the first request using a first protocol, where the second request uses a second, different protocol.

10. A method, comprising:

in response to receipt of a first request relating to establishing a wireless communication link between a first apparatus and a third apparatus, transmitting a second request to the third apparatus, where the request requests the third apparatus to change a time period between wireless transmission by the third apparatus of periodic signals configured to enable a wireless communication link to be established between the third apparatus and the first apparatus further comprising receiving the first request using a first protocol, where the second request uses a second, different protocol.

11. An apparatus, comprising at least one processor; and at least one memory including computer program code, the at least one memory and the computer program code configured to, with the at least one processor, cause the apparatus to perform at least the following:

to transmit, according to a first communication protocol, a request to a second apparatus, where the request requests the second apparatus to assist in establishing a wireless communication link according to a second communication protocol between the apparatus and a third apparatus, and where the request comprises a request that the third apparatus change a time period between wireless transmission by the third apparatus of periodic signals configured to enable a wireless communication link to be established with the third apparatus.

12. The apparatus of claim 11, where the at least one memory and the computer program code are further configured to, with the at least one processor, cause the apparatus to receive signals configured to enable a wireless communication link to be established with the third apparatus.

13. The apparatus of claim 12, where the at least one memory and the computer program code are further configured to, with the at least one processor, cause the apparatus to cause the apparatus, in response to receiving at least one of the signals to establish the communication link with the third apparatus based at least in part on the received at least one signal.

14. A method, comprising:

transmitting, according to a first communication protocol, a request to a second apparatus, where the request requests the second apparatus assist in establishing a wireless communication link according to a second communication protocol between the apparatus and a third apparatus, and where the request comprises a request that the third apparatus change a time period between wireless transmission by the third apparatus of periodic signals configured to enable a wireless communication link to be established with the third apparatus.

15. The method of claim 14, further comprising, in response to transmitting the request, receiving, from the third apparatus, signals configured to enable the wireless communication link to be established with the third apparatus.

16. The method of claim 15, further comprising, in response to receiving at least one of the signals, establishing the communication link according to the second communication between the apparatus and the third apparatus based at least in part on the received at least one signal.

* * * * *

UNITED STATES PATENT AND TRADEMARK OFFICE
CERTIFICATE OF CORRECTION

PATENT NO.         : 8,565,672 B2
APPLICATION NO.    : 12/772325
DATED              : October 22, 2013
INVENTOR(S)        : Klaus Franz Doppler et al.

Page 1 of 1

It is certified that error appears in the above-identified patent and that said Letters Patent is hereby corrected as shown below:

IN THE CLAIMS:

In Claim 9, Column 23, line 26, delete "on" and replace with -- one --

Signed and Sealed this
Twenty-fourth Day of December, 2013

Margaret A. Focarino
*Commissioner for Patents of the United States Patent and Trademark Office*